(12) United States Patent
Soncini

(10) Patent No.: US 8,474,601 B2
(45) Date of Patent: Jul. 2, 2013

(54) CONTAINER TRANSFER DEVICE HAVING A TRANSFER GUIDING MEMBER

(75) Inventor: Michele Soncini, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 21 days.

(21) Appl. No.: 12/596,570

(22) PCT Filed: Apr. 20, 2007

(86) PCT No.: PCT/IB2007/002291
§ 371 (c)(1),
(2), (4) Date: Jan. 12, 2010

(87) PCT Pub. No.: WO2008/129346
PCT Pub. Date: Oct. 30, 2008

(65) Prior Publication Data
US 2010/0108473 A1    May 6, 2010

(51) Int. Cl.
*B65G 29/00*    (2006.01)
(52) U.S. Cl.
USPC .................................. 198/480.1; 198/481.1
(58) Field of Classification Search
USPC ....................... 198/478.1, 479.1, 480.1, 481.1
See application file for complete search history.

(56) References Cited

U.S. PATENT DOCUMENTS

| | | | | |
|---|---|---|---|---|
| 3,565,232 | A | * | 2/1971 | Cadwallader .............. 198/476.1 |
| 4,114,347 | A | * | 9/1978 | Morris et al. .............. 198/481.1 |
| 5,123,518 | A | * | 6/1992 | Pfaff ......................... 198/480.1 |
| 5,439,095 | A | * | 8/1995 | Lentz et al. ................ 198/480.1 |
| 5,695,041 | A | * | 12/1997 | Kouda et al. .............. 198/459.2 |
| 6,591,967 | B1 | | 7/2003 | Doudement et al. |
| 2003/0106779 | A1 | | 6/2003 | Stocchi |

FOREIGN PATENT DOCUMENTS

WO    01/42113 A1    6/2001

\* cited by examiner

*Primary Examiner* — James R Bidwell
(74) *Attorney, Agent, or Firm* — Sughrue Mion, PLLC

(57) ABSTRACT

Device (10) for transferring containers (2) from a feed rail (9) to a rotary star wheel (3). The device (10) has a transfer wheel (11) provided, on its periphery, with a plurality of recesses (12) for engaging containers (2) under their neck (7) and moving the containers (2) along a transfer path (15) extending from a loading point (13) at an end of the feed rail (9) to an unloading point (16) at the periphery of the rotary star wheel (3). Also included is a guiding member (18) having a flat lower surface (19) extending at least partly above the transfer path (15) at a distance from the transfer wheel (11) substantially equal to the height of the container neck (7).

15 Claims, 6 Drawing Sheets

CONTAINER TRANSFER DEVICE HAVING A TRANSFER GUIDING MEMBER

FIELD OF THE INVENTION

The invention relates to the container handling, and more precisely to a device for transferring containers from a feed rail to a starwheel. Such a transfer device may be part of a filling machine, wherein blow-molded containers are conveyed from a blow molding unit to a filling unit and a capping unit, before they are grouped and packed for transportation.

BACKGROUND OF THE INVENTION

Usually, blow-molded containers are transported by the neck in a row along a feeding rail, where they slide freely by gravity or in which they are forced to move by a compressed air stream.

Before they are gripped by a starwheel in order to be moved to a filling unit at a predetermined rate, the containers must be spaced apart at a predetermined pitch. This is why there is generally provided a transfer wheel connecting the feed rail to the starwheel. The transfer wheel comprises, at its periphery, a plurality of recesses equally spaced apart. Each recess engages a container at a loading point located at an end of the feeding rail, and releases it at an unloading point located at a periphery of the starwheel. Containers follow an arc-of-circle path from the loading point to the unloading point.

Such a structure is disclosed in Italian patent application IT 1 260 380 (Parmatec). One can also refer to US patent application No. 2003/0106779 (Stocchi) and to U.S. Pat. No. 6,591,967 (Doudement).

During the transfer, containers are subjected to acceleration and deceleration forces, both tangential and radial. As the containers are suspended by their necks, such forces may cause container misalignment, thereby resulting in wrong positioning of the containers on the starwheel and possibly causing damages to the filling machine.

In order to prevent such damages, a classical solution consists in providing the machine with means for sensing wrong positioning and means for ejecting wrongly positioned containers from the starwheel.

As long as machine safety is the only concern, such a solution is unquestionably efficient. However, it is complex to set up and does not prevent reduction of production rates.

SUMMARY OF THE INVENTION

It is one object of the invention to provide a transfer device which reduces the risk of container misalignment.

The proposed transfer device comprises:
a transfer wheel provided, on its periphery, with a plurality of recesses for engaging containers under their neck and moving the containers along a transfer path extending from a loading point at an end of the feed rail to an unloading point at the periphery of the rotary starwheel, and
a guiding member having a flat lower surface extending at least partly above said path at a distance from the transfer wheel substantially equal to the height of the container neck.

The above and other objects and advantages of the invention will become apparent from the detailed description of preferred embodiments, considered in conjunction with the accompanying drawings.

DESCRIPTION OF PREFERRED EMBODIMENTS

Figure 1:
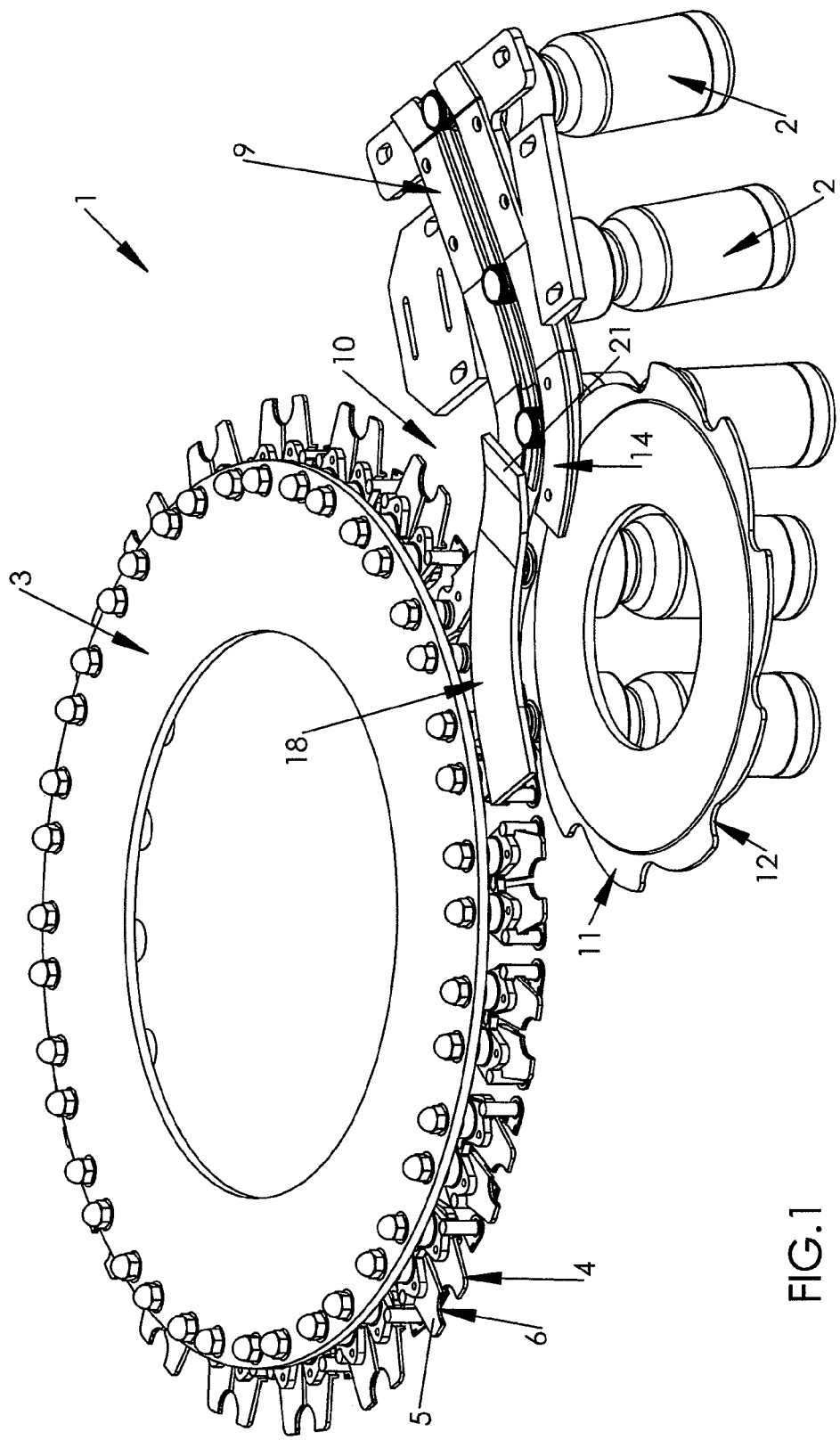
FIG. 1 is a top perspective view showing part of a filling machine comprising a feed rail, a starwheel and a device for transferring containers from the one to the other.
Figure 2:
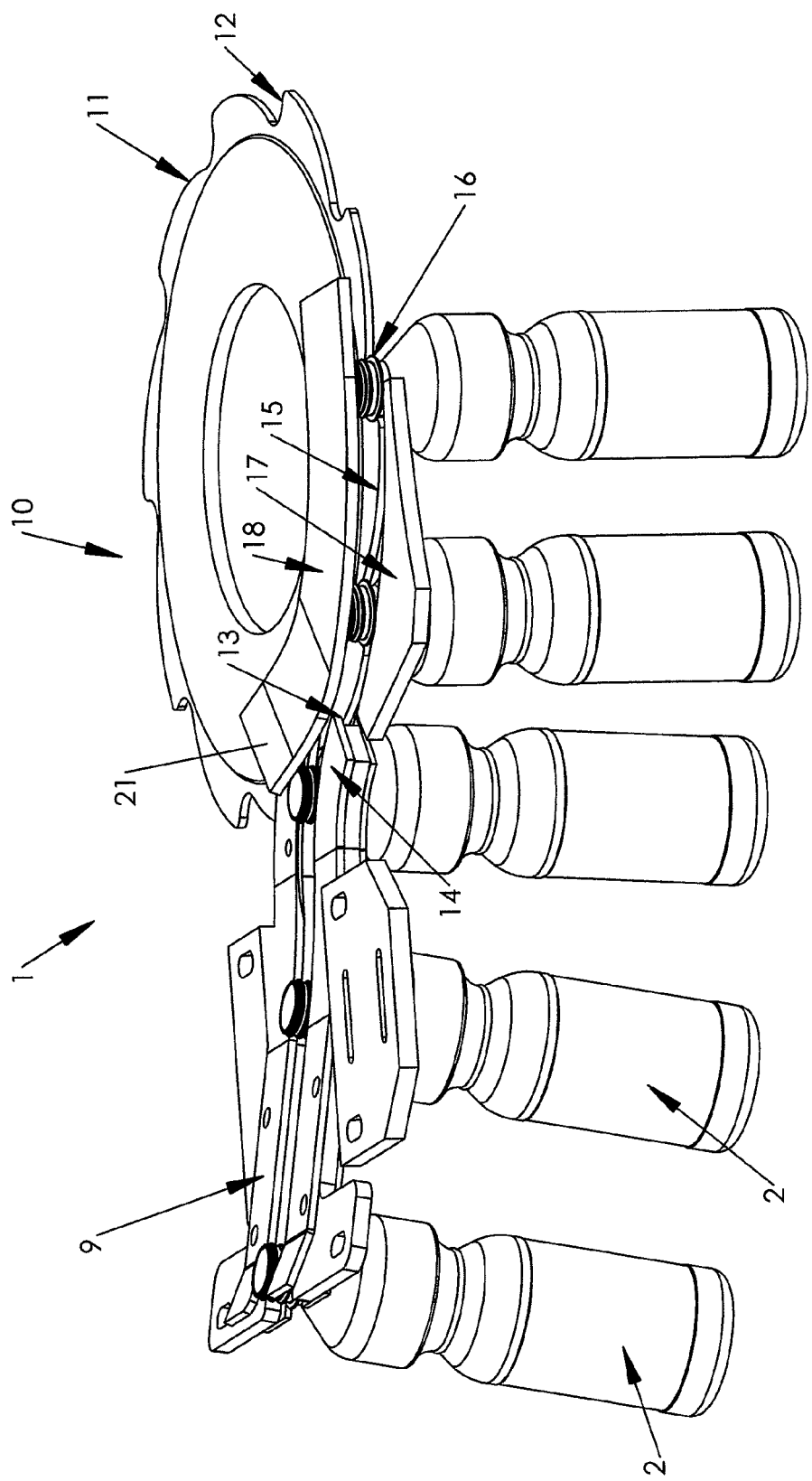
FIG. 2 is a side perspective view of the container transfer device.
Figure 3:
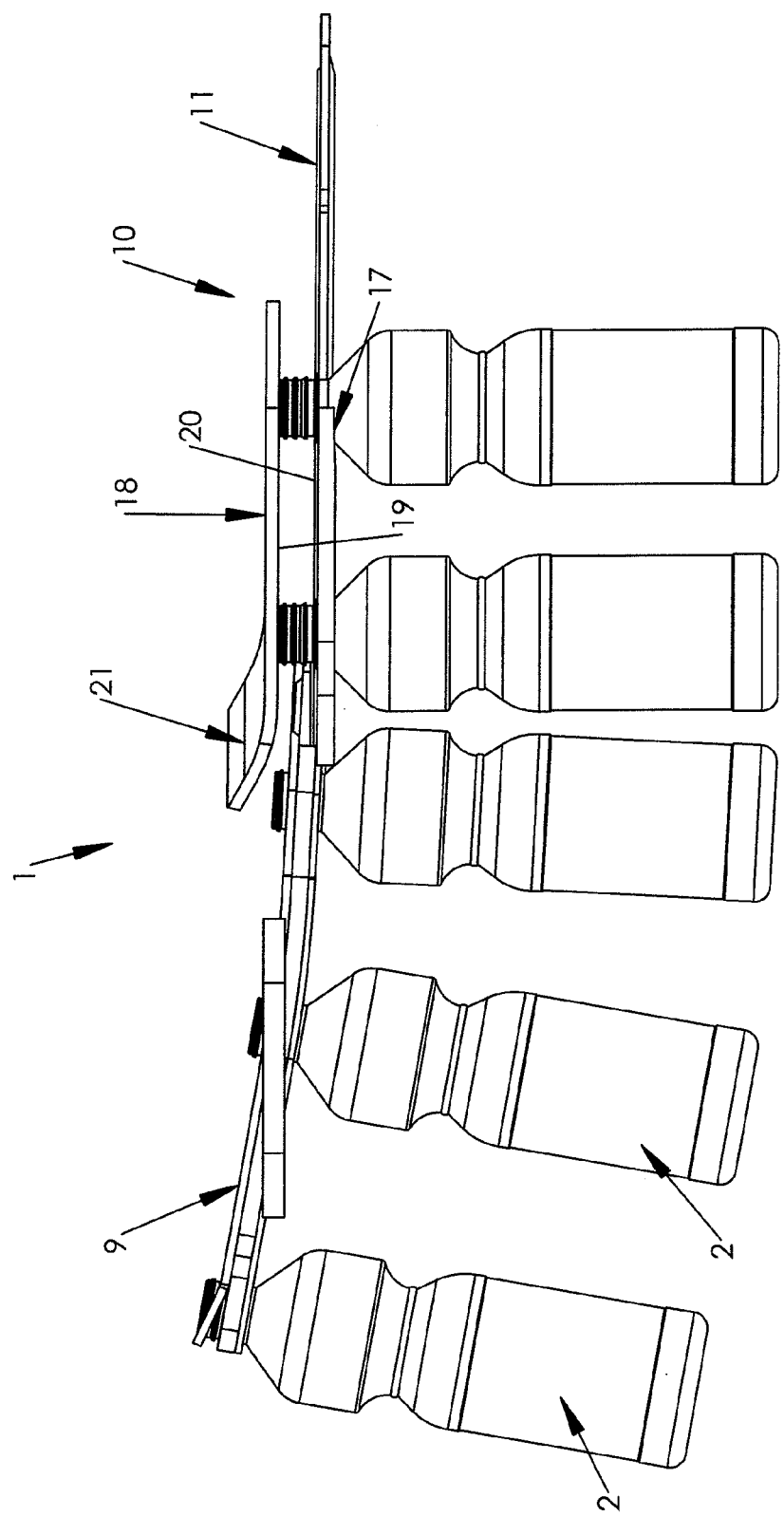
FIG. 3 is a side elevation view of the container transfer device.

Referring to FIG. 1, there is partly shown a machine 1 for handling containers 2, comprising a rotary star wheel 3 provided, all along its periphery, with a plurality of gripping elements 4. Each gripping element 4 comprises a pair of jaws 5 pivotally mounted on the star wheel 3 and having a cut-out 6 wherein the containers 2 are clipped and held.

Each container 2 has a neck 7 at the base of which a collar 8 is provided to permit container sustentation during the handling thereof. Empty molded containers 2 are fed from a container molding unit (not shown) trough a feed rail 9 wherein the containers 2 are suspended by their collar 8 and in which they slide in a single row. As depicted on FIG. 1, the feed rail 9 is inclined, in order to accelerate the containers 2 approaching the star wheel 3.

In the feed rail 9, the distance between successive containers 2 is not constant. It is therefore required that the containers 2 be spaced apart at a predetermined pitch before they are loaded on the star wheel 3.

This is why the container handling machine 1 further comprises a device 10 for transferring the containers 2 from the feed rail 9 to the rotary star wheel 3. As depicted on FIG. 1, the transfer device 10 comprises a transfer wheel 11 adjacent both to the star wheel 3 and the feed rail 9.

The transfer wheel 11 is pivotally mounted around an axis of rotation parallel to the axis of rotation of the star wheel 3. The transfer wheel 11 is provided, on its periphery, with a plurality of recesses 12 for engaging containers 2 under their collar 8 at a loading point 13 at an end of the feeding rail 9.

Figure 4:
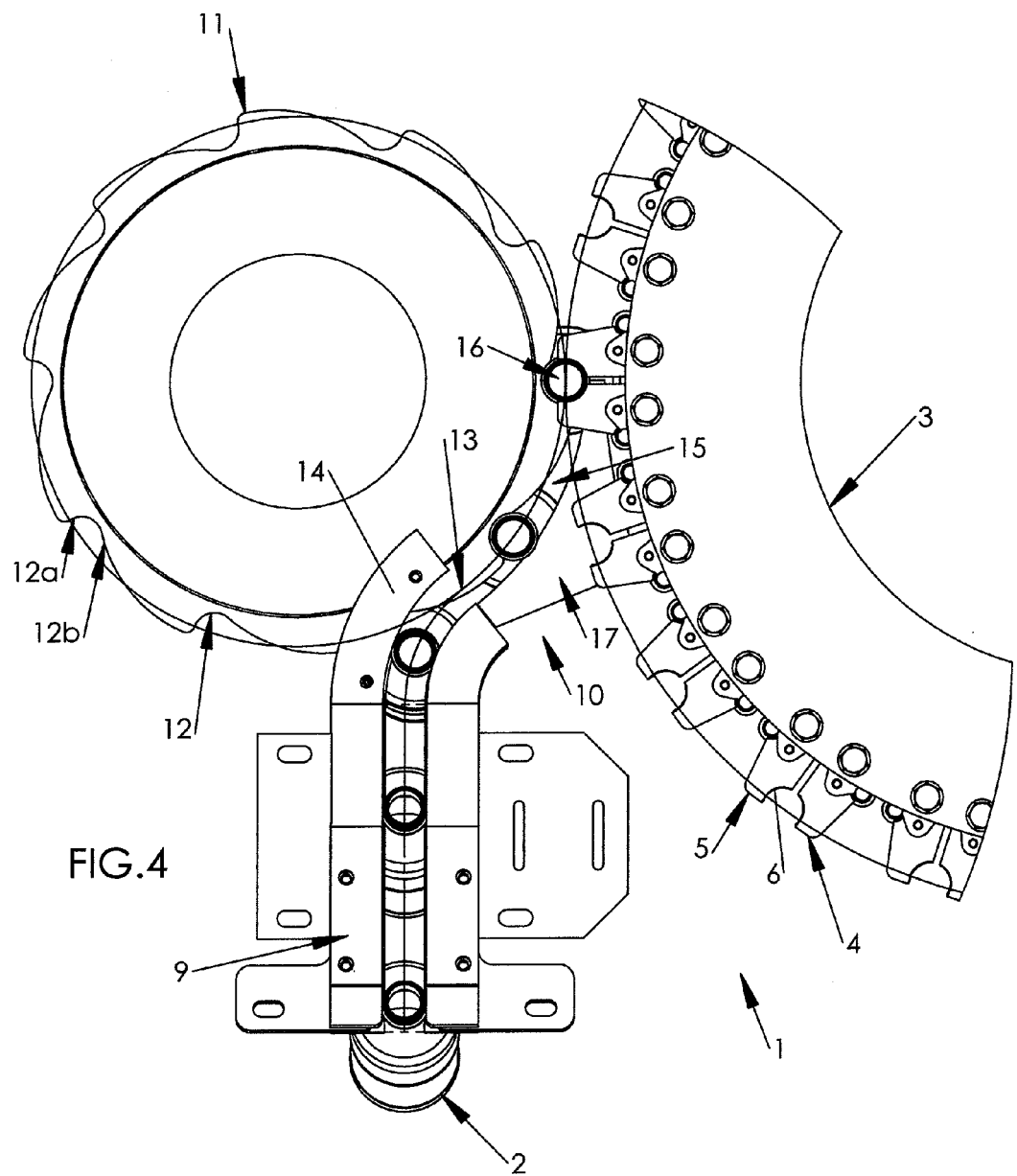
FIG. 4 is a top plan view of the container transfer device, without the guiding member.
Figure 5:
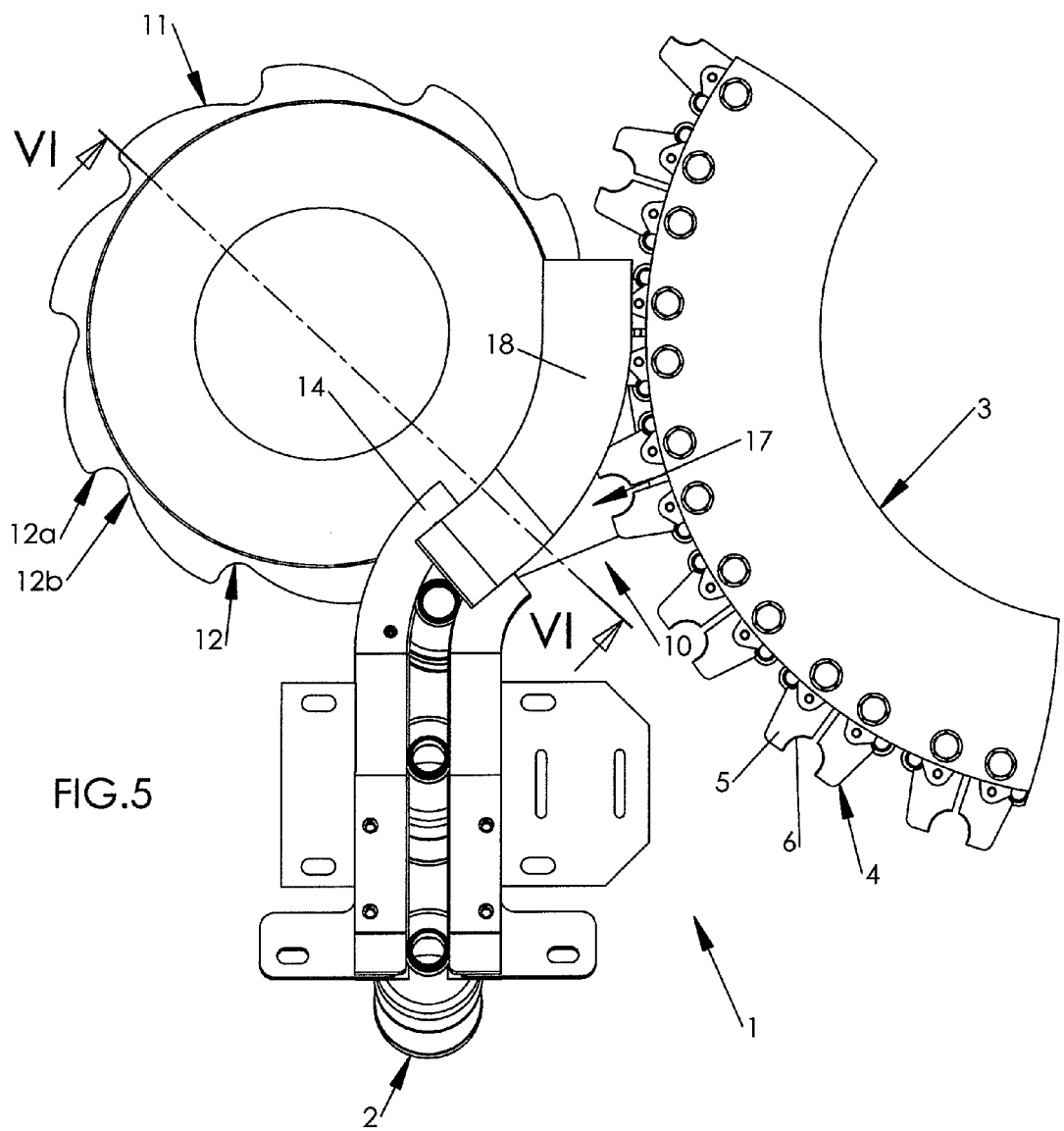
FIG. 5 is a top plan view of the container transfer device, with the guiding member.
Figure 6:
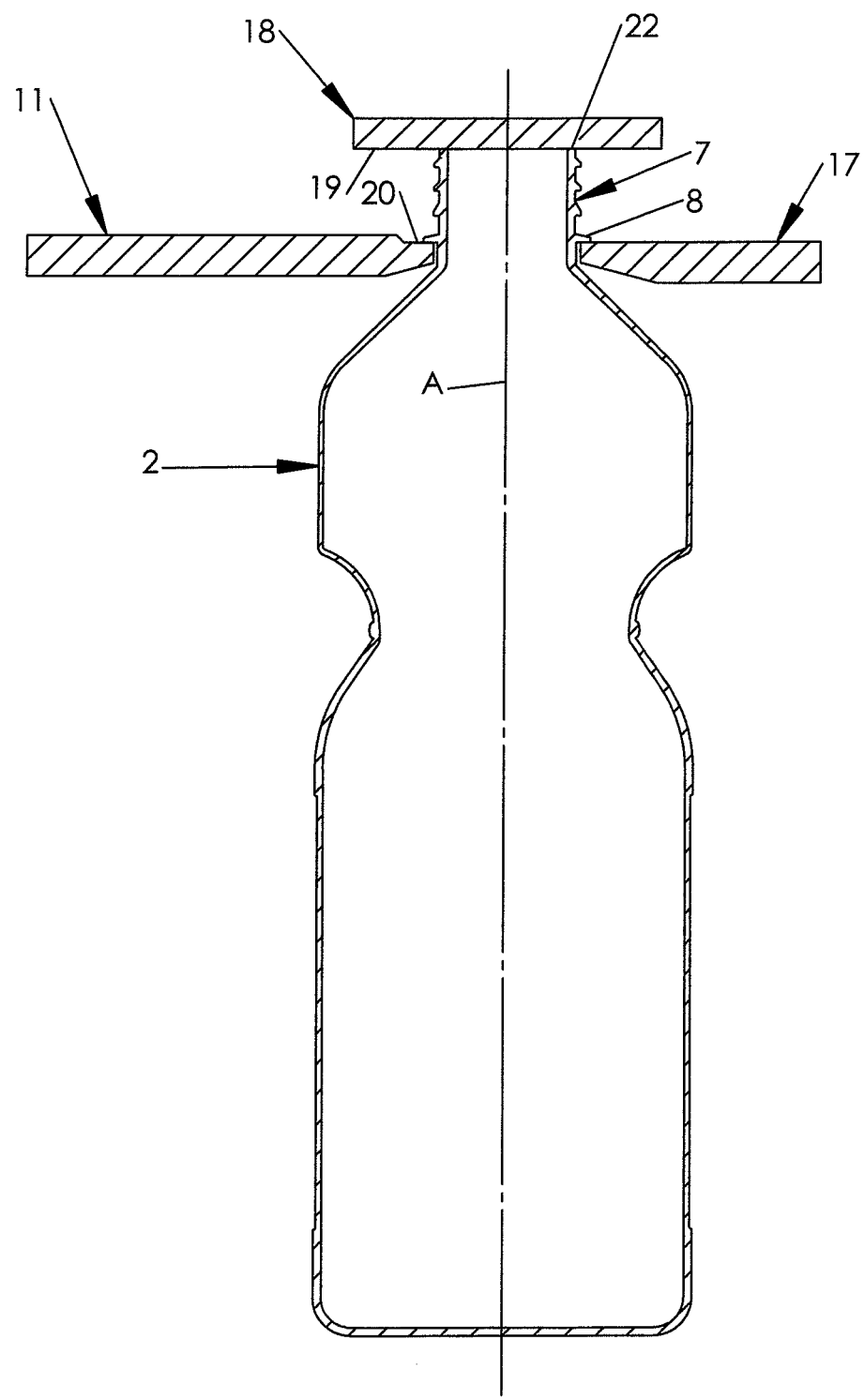
FIG. 6 is an enlarged side elevation cut view showing the container transfer device.

It can be seen on FIG. 4 that an end portion 14 of the feeding rail 9 is curved so that the end of the feeding rail 9 opens tangentially with respect of the transfer wheel 11.

The containers 2 engaged by the transfer wheel 11 at the loading point 13 are moved along an arc-of-circle transfer path 15 extending from the loading point 13 to an unloading point 16 at the periphery of the star wheel 3, at which point 16 the transfer wheel 11 is tangent to the star wheel 3 and where the containers 2 are clipped into the gripping elements 4, unloaded from the transfer wheel 11 and loaded onto the star wheel 3. In the depicted example, the transfer path 15 extends over about 45°.

As depicted on FIG. 4, the transfer wheel 11 is asymmetric and shaped like a blade of a circular saw, each recess 12 having a short portion 12a which extends radially, and a long portion 12b which extends peripherally, in order to facilitate smooth tangent loading of each containers 2, the neck 7 of which slides, once reached the loading point 13, against the long portion 12b before it is grabbed by the short portion 12a.

The transfer device 10 further comprises an external curved guide 17 which extends in a concentric way with respect of the transfer wheel 11, between the feed guide 9 and the star wheel 3. The guide 17 is substantially coplanar with the transfer wheel 11 and spaced therefrom at a distance substantially equal to the diameter of the container neck 7, whereby each container 2, while being moved along the transfer path 15, is suspended by its collar 8 between the corresponding recess 12 and the curved guide 17.

In a preferred embodiment, the end of the feed guide 9 overlaps both the transfer wheel 11 and the curved guide 17—which are located vertically beneath the feed guide 9—in order to minimize lateral movement of the containers 2.

In addition, the transfer device 10 further comprises a top guiding member 18 provided with a flat lower surface 19 extending at least partly above the transfer path 15 at a distance from an upper surface 20 of the transfer wheel 11, at the level of the recesses 12, substantially equal to the height of the container neck 7.

In a preferred embodiment, as depicted on the drawings (except on FIG. 4 where the top guiding member 18 has been removed in order to allow visual access to the transfer path 15), the guiding member 18 is comprised of a flat plate made of metal (such as stainless steel) or a synthetic resin (such as polyamide) extending all along the transfer path 15, i.e. over about 45°.

As depicted on FIG. 4, guiding member 18 has a curved shape when seen from the top and comprises a back portion or tail 21 which overlaps the feed guide 9 at the loading point 13. In a preferred embodiment, the tail 21 is turned up with respect of a horizontal plane, in order to facilitate introduction of the containers 2 under the lower surface 19 when transferred from the feed rail 9 onto the transfer wheel 11 at the loading point 13.

Accordingly, each container 2 is tightly held between, on the one hand, the transfer wheel 11 and the curved guide 17 on which the container 2 rests by its collar 8 and, on the other hand, the guiding member 18 which is located immediately above an opening 22 of the container 2 with a small clearance (e.g. 1/10 mm). Each container 2 is therefore held in a position where its main axis A remains vertical, thereby minimizing risks of misalignment at the unloading point 16. And, since smoothness of the movement is increased, so can also be the speed rate of the machine 1.

The invention claimed is:

1. Device for transferring containers from a feed rail to a rotary star wheel, said device comprising:
   a transfer wheel provided, on its periphery, with a plurality of recesses for engaging containers under their neck, said transfer wheel defining a transfer path for the containers extending from a loading point at an end of the feed rail to an unloading point at the periphery of the rotary star wheel, and
   a guiding member having a flat lower surface extending at least partly above said transfer path at a distance from the transfer wheel substantially equal to a height of the container neck, with a clearance,
   wherein said guiding member extends all along the transfer path, so that a first end portion of said guiding member is located vertically above the end of the feed rail and a second end portion of said guiding member is located vertically above the periphery of the star wheel and another portion of said guiding member is located vertically above the transfer wheel.

2. Device according to claim 1, further comprising an external guide substantially coplanar with the transfer wheel and spaced therefrom.

3. Device according to claim 1, wherein said guiding member extends over about 45°.

4. Device according to claim 1, wherein said guiding member is comprised of a flat plate.

5. Device according to claim 1, wherein said guiding member has a curved shape.

6. The device according to claim 1, wherein the rotary star wheel includes gripping elements pivotally mounted on the periphery of the rotary star wheel for receiving the containers from the transfer wheel and holding the containers on the rotary star wheel.

7. Device for transferring containers from a feed rail to a rotary star wheel, said device comprising:
   a transfer wheel provided, on its periphery, with a plurality of recesses for engaging containers under their neck, said transfer wheel defining a transfer path for the containers extending from a loading point at an end of the feed rail to an unloading point at the periphery of the rotary star wheel, and
   a guiding member having a flat lower surface extending at least partly above said transfer path at a distance from the transfer wheel substantially equal to a height of the container neck, with a clearance,
   wherein said guiding member has a back portion turned up at the loading point.

8. A device for transferring containers from a feed rail to a rotary star wheel, the device comprising:
   a transfer wheel comprising on a periphery of the transfer wheel a plurality of recesses configured to engage containers, the transfer wheel defining a transfer path for the containers and configured to deliver the containers from a loading point at an end of the feed rail to an unloading point at a periphery of the rotary star wheel;
   a guiding member comprising a flat lower surface extending at least partly above the transfer path at a distance from the transfer wheel substantially equal to a height of the container neck, wherein the guiding member extends along an entire length of the transfer path, so that a first end portion of said guiding member is located vertically above the end of the feed rail and a second end portion of said guiding member is located vertically above the periphery of the star wheel and another portion of said guiding member is located vertically above the transfer wheel.

9. The device according to claim 8, wherein the distance from the transfer wheel is equal to the height of the container neck plus a clearance.

10. The device according to claim 8, wherein the rotary star wheel includes gripping elements pivotally mounted on the periphery of the rotary star wheel for receiving the containers from the transfer wheel and holding the containers on the rotary star wheel.

11. The device according to claim 8, wherein the guiding member extends over about a 45° arc.

12. The device according to claim 8, wherein the guiding member comprises a flat plate extending over the transfer path.

13. The device according to claim 8, wherein the guiding member has a curved shape.

14. The device according to claim 8, further comprising an external guide substantially coplanar with the transfer wheel and spaced apart from the transfer wheel.

15. A device for transferring containers from a feed rail to a rotary star wheel the device comprising:
   a transfer wheel comprising on a periphery of the transfer wheel a plurality of recesses configured to engage containers, the transfer wheel defining a transfer path for the containers and configured to deliver the containers from a loading point at an end of the feed rail to an unloading point at a periphery of the rotary star wheel;

a guiding member comprising a flat lower surface extending at least partly above the transfer path at a distance from the transfer wheel substantially equal to a height of the container neck, wherein the guiding member has an end portion turned up at the loading point.

\* \* \* \* \*